(12) United States Patent
Goggin et al.

(10) Patent No.: US 10,761,230 B2
(45) Date of Patent: Sep. 1, 2020

(54) SYSTEM AND METHOD FOR IDENTIFYING ARTIFACTS IN SEISMIC IMAGES

(71) Applicant: CHEVRON U.S.A. INC., San Ramon, CA (US)

(72) Inventors: Lisa Renee' Goggin, Sugar Land, TX (US); Ke Wang, Houston, TX (US); Maisha Lara Amaru, Houston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 314 days.

(21) Appl. No.: 15/725,375

(22) Filed: Oct. 5, 2017

(65) Prior Publication Data

US 2018/0095185 A1 Apr. 5, 2018

Related U.S. Application Data

(60) Provisional application No. 62/404,313, filed on Oct. 5, 2016.

(51) Int. Cl.
*G01V 1/30* (2006.01)
*G01V 1/32* (2006.01)
*G01V 1/36* (2006.01)
*G01V 1/34* (2006.01)

(52) U.S. Cl.
CPC ............. *G01V 1/30* (2013.01); *G01V 1/301* (2013.01); *G01V 1/32* (2013.01); *G01V 1/36* (2013.01); *G01V 1/34* (2013.01); *G01V 2210/40* (2013.01); *G01V 2210/522* (2013.01); *G01V 2210/58* (2013.01); *G01V 2210/64* (2013.01); *G01V 2210/74* (2013.01)

(58) Field of Classification Search
CPC .......... G01V 1/30; G01V 1/32; G01V 2210/40
USPC ............................................. 702/16
See application file for complete search history.

(56) References Cited

U.S. PATENT DOCUMENTS

| 7,769,546 | B2 | 8/2010 | Lomask et al. | |
|---|---|---|---|---|
| 8,614,930 | B2* | 12/2013 | Zhang | G01V 1/282 367/43 |
| 2005/0180262 | A1 | 8/2005 | Robinson | |
| 2011/0075516 | A1 | 3/2011 | Xia et al. | |
| 2012/0144306 | A1* | 6/2012 | Moody | E21B 43/00 715/733 |
| 2016/0341837 | A1* | 11/2016 | Jing | G01V 1/364 |
| 2017/0219733 | A1* | 8/2017 | Morton | G01V 1/364 |
| 2017/0235003 | A1* | 8/2017 | Elboth | G01V 1/3808 367/17 |

(Continued)

OTHER PUBLICATIONS

U.S. Appl. No. 14/595,964, filed Wang et al.

(Continued)

*Primary Examiner* — Eman A Alkafawi
(74) *Attorney, Agent, or Firm* — Marie L. Clapp

(57) ABSTRACT

A method is described for seismic imaging that may include receiving digital seismic data; processing the digital seismic data to create a digital seismic image in a seismic domain; flattening the digital seismic image to generate a digital flattened image; identifying artifacts in the digital flattened image; transforming the artifacts back into the seismic domain; and reprocessing the digital seismic data based on the artifacts in the seismic domain to generate a digital image with reduced artifacts. The method may be executed by a computer system.

4 Claims, 4 Drawing Sheets

(56) References Cited

U.S. PATENT DOCUMENTS

2017/0285196 A1* 10/2017 Zhang .................. G01V 1/38

OTHER PUBLICATIONS

PCT International Search Report and Written Opinion, International Application No. PCT/US2017/055262, dated Jan. 15, 2018, p. 1-14.
Kabir, MM, et al., Toward true amplitude multiple removal, The Leading Edge, Tulsa, OK, Jan. 1999, p. 1-8.
Storch, Ina et al., Seismic imaging of a megathrust splay fault in the North Chilean subduction zone (Central Andes), Mar. 10, 2016, Tectonophysics, Elsevier, Amsterdam, NL, p. 1-10.
Woodward, Marta, Automated 3D tomographic velocity analysis of residual moveout in prestack depth migrated common image point gathers, 1998 SEC Expanded Abstracts, p. 1-4.
Woodward, M.J., et al., A decade of tomography, Geophysics, vol. 73, No. 5 Sep.-Oct. 2008, p. 1-4.

* cited by examiner

FIG. 3A
FIG. 3B

SYSTEM AND METHOD FOR IDENTIFYING ARTIFACTS IN SEISMIC IMAGES

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for deriving seismic images of the subsurface from geophysical seismic data and, in particular, to methods of using densely mapped horizons in seismic images in order to facilitate exploration for and production of hydrocarbons.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors. The recorded waveforms (peaks and troughs, often referred to as seismic wavelets) are a quantitative characterization of the geologic boundaries, or subsurface reflectors. Seismic reflection occurs at every location where there is a change in rock or fluid properties. In addition to seismic data recorded in the field, it is also possible to generate synthetic seismic data with a computer that models the seismic sources and computes the propagation of the seismic energy, including reflections, and the seismic data that would be recorded at synthetic seismic sensors.

Seismic data is processed to create digital seismic images of the subsurface that can be interpreted to identify geologic features including hydrocarbon deposits. Continuous, coherent reflectors seen in the seismic image can be described as complex 3D surfaces with a trackable dip. 3-D digital seismic images may contain a nearly infinite number of these highly complex dipping surfaces. The seismic wavelets' amplitude and phase respond directly to variations in rock and fluid properties, and depths at which these changes in properties occur are physical boundaries which may be computed from seismic data when they are properly mapped. It is critical that these data be mapped at the highest resolution possible in order to achieve an accurate subsurface description.

Manual seismic reflector mapping is slow but generally accurate and can yield only a very small set of reflector boundaries before project decisions must be made. Signal-dependent automated wavelet tracking is fast but becomes progressively inaccurate with decreasing signal-to-noise ratios. This approach can be automated to produce high-density depth determinations that capture all physical boundaries present within seismic images—a critical advance for seismic interpretation. Unfortunately, since a significant amount of uncertainty exists in any reflector-mapping approach, conventional ability to predict the positions of physical boundaries often falls short of accomplishing the perfect trace-to-trace alignment necessary to produce highly accurate maps. To facilitate the use of full-volume, reflector mapping, an automated method is needed to correctly map horizons.

The ability to define, at high granularity, the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for methods that may use densely mapped horizons in seismic images that will facilitate enhanced exploration for and production of potential hydrocarbon reservoirs.

SUMMARY

In accordance with some embodiments, a method of seismic imaging including receiving digital seismic data; processing the digital seismic data to create a digital seismic image in a seismic domain; flattening the digital seismic image to generate a digital flattened image; identifying artifacts in the digital flattened image; transforming the artifacts back into the seismic domain; and reprocessing the digital seismic data based on the artifacts in the seismic domain to generate a digital image with reduced artifacts is disclosed.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

FIGS. 3A and 3B show attributes of seismic images; and

Like reference numerals refer to corresponding parts throughout the drawings.

DETAILED DESCRIPTION OF EMBODIMENTS

Described below are methods, systems, and computer readable storage media that provide a manner of seismic imaging. These embodiments are designed to be of particular use for seismic imaging of subsurface volumes including horizon mapping.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging of the subsurface is used to identify potential hydrocarbon reservoirs. Seismic data is acquired at a surface (e.g. the earth's surface, ocean's surface, or at the ocean bottom) as seismic traces which collectively make up the seismic dataset. The seismic data is processed to generate digital seismic images. For decision-making purposes, the location of subsurface rock boundaries is communicated using seismic mapping, the process by which rugose 3-dimensional rock boundaries are displayed on a flat plane using a computer. Existing seismic interpretation software packages such as Schlumberger's Petrel and Paradigm's EPOS suite allow rapid movement of planar viewing surfaces (vertical and horizontal) through 3D seismic images. In order to efficiently review all available information within a 3D seismic image, it is desirable to translate all dipping seismic reflections onto planar surfaces through a process referred to as "volumetric flattening". When a seismic image is properly flattened, the rapid movement of a horizontal visualization plane through the data reveals the morphological form and facies changes associated with geologic boundaries. If the calculation by which flattening is performed is retained and an inverse transform of this computation is applied, the depth or time to any of the nearly infinite surfaces may be determined.

The present invention includes embodiments of a method and system for seismic imaging including horizon mapping. The densely mapped horizons allow various methods for improved interpretation of the subsurface. This improves decisions impacting budgetary planning, obtaining mineral and lease rights, signing well commitments, permitting rig locations, designing well paths and drilling strategy, preventing subsurface integrity issues, planning proper casing and cementation strategies, and selecting and purchasing appropriate completion and production equipment.

Figure 1:
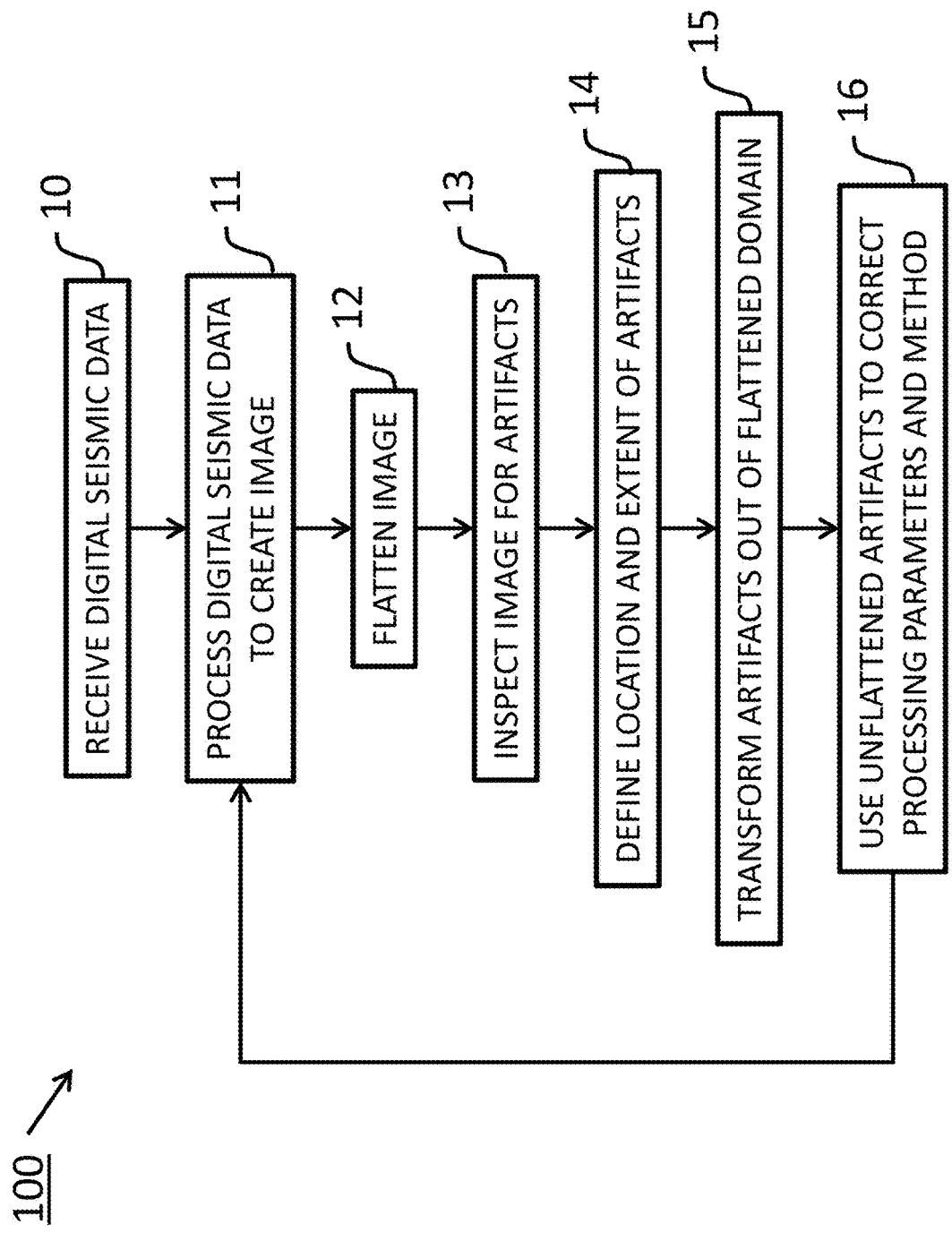
FIG. 1 illustrates a flowchart of a method of seismic imaging including horizon mapping, in accordance with some embodiments.

FIG. 1 illustrates a flowchart of a method 100 for seismic imaging including horizon mapping. At operation 10, digital seismic data is received. As previously described, a seismic dataset including a plurality of traces was recorded at a plurality of seismic sensors, either in the field or as a synthetic seismic survey modeled by a computer.

At operation 11, the digital seismic data is processed to create a digital seismic image. The seismic image is generated from a seismic dataset that may have been subjected to a number of seismic processing steps, such as deghosting, multiple removal, spectral shaping, and some type of seismic imaging such as migration. These examples are not meant to be limiting. Those of skill in the art will appreciate that there are a number of useful seismic processing steps that may be applied to seismic data to create a seismic image.

Seismic acquisition and processing artifacts are common in 3D seismic data and images. These artifacts are recognized as erroneous dipping reflectors that often obscure or distort true geologic features. It can be difficult to recognize the "finger print" of artifacts and many geologists may mistakenly interpret these artifacts as real geologic features. What is needed is a tool that can reveal and make obvious, artifacts within processed data so that seismic processors can more effectively work to eliminate these artifacts.

At operation 12, the digital seismic image is flattened. The flattening can be done in a number of ways. For example, the flattening may be accomplished based on the method described by U.S. Pat. No. 7,769,546, Method for Indexing a Subsurface Volume For The Purpose of Inferring Geologic Information, or U.S. patent application Ser. No. 14/595,964, System and Method for Generating a Depositional Sequence Volume from Seismic Data. Either of these methods may produce so-called tau-volumes, which provide the transform between seismic sample locations in the raw cube (original seismic image) and locations in the flattened cube (flattened seismic image). These methods may also compute dips throughout the image volumes.

The dip computations and subsequent flattening, when run on un-smoothed data, may capture evidence of processing artifacts or problems including, but not limited to 1) acquisition footprint, 2) ground roll, and 3) low signal/noise ratios. Additionally, if seismic processing has erroneously aligned seismic reflectors, the flattening operation will generate a confused or disjointed image that would be recognized by misalignment of geologically meaningful features. The flattened image volume is inspected 13 for such artifacts. This inspection may be done by displaying the flattened image on a graphical display unit for the user or it may be done by the computer which may be programmed to scan the image volume for anticipated artifact patterns. The flattened volume may be inspected along all dimensions and in map view (x-y planes) and section view (x or y and depth/time planes).

Examples of presumed seismic artifact recognition criteria may include but are not limited to:

a) Processing footprints may appear as linear patterns that are aligned with the acquisition direction and are evident through a significant vertical (depth/time axis) extent of the seismic volume.

b) Presumed over/under migration or ground roll effects may appear as arcs or semi-concentric "rings" and shadows within the 3D volume.

c) Low signal/noise ratio is well captured by a highly chaotic Vflat-DSV dip estimation cube or a low dip confidence value. Inspection of the dip confidence cube reveals where poorly filtered noise trains are present within 3D seismic volumes allowing processors to attempt to compensate for or remove these artifacts.

Figure 2B:
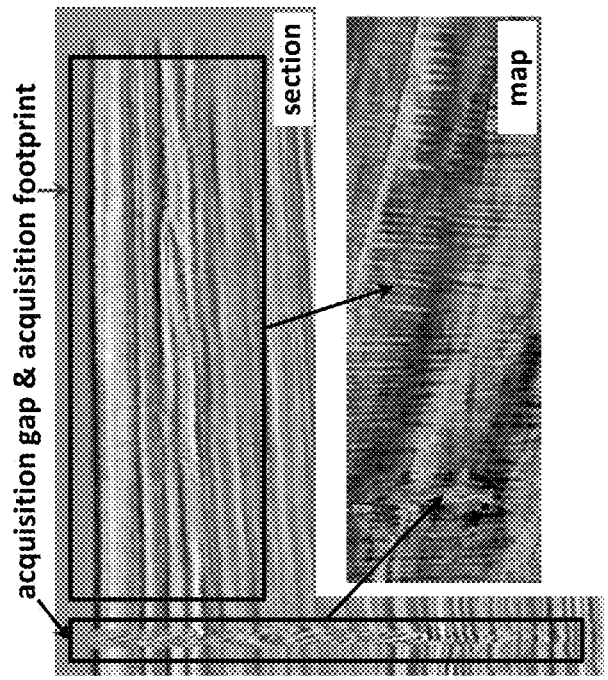
FIGS. 2A and 2B show seismic images with artifacts.
Figure 2A:
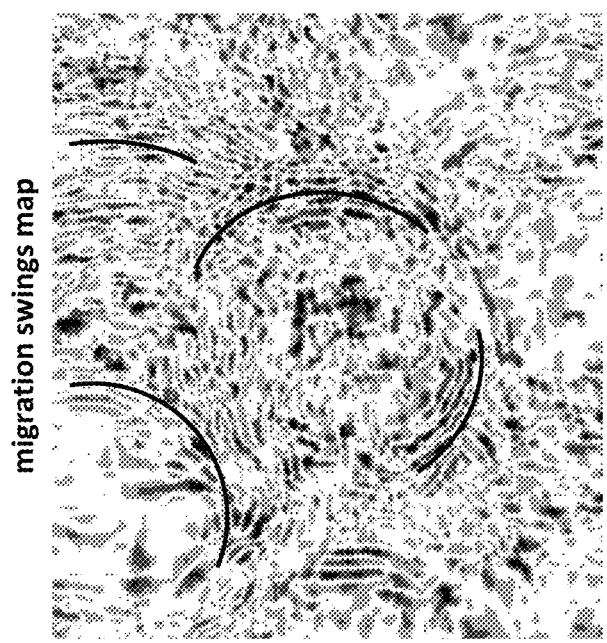

FIGS. 2A, 2B, 3A, and 3B show examples of some possible artifacts. FIG. 2A shows migration swings on a flattened horizon. FIG. 2B shows acquisition artifacts such as acquisition gaps and acquisition footprint in map and section views. FIG. 3A shows a dip confidence map and FIG. 3B is a dip confidence section.

Referring again to FIG. 1, if artifacts are identified, the location and extent is defined 14 and the artifacts are transformed back to the original seismic domain 15 using the tau-volumes from operation 12. These artifact outlines/identifiers can then be used to correct the processing and parameterization 16 previously used and the method may repeat operations 11-16.

Figure 4:
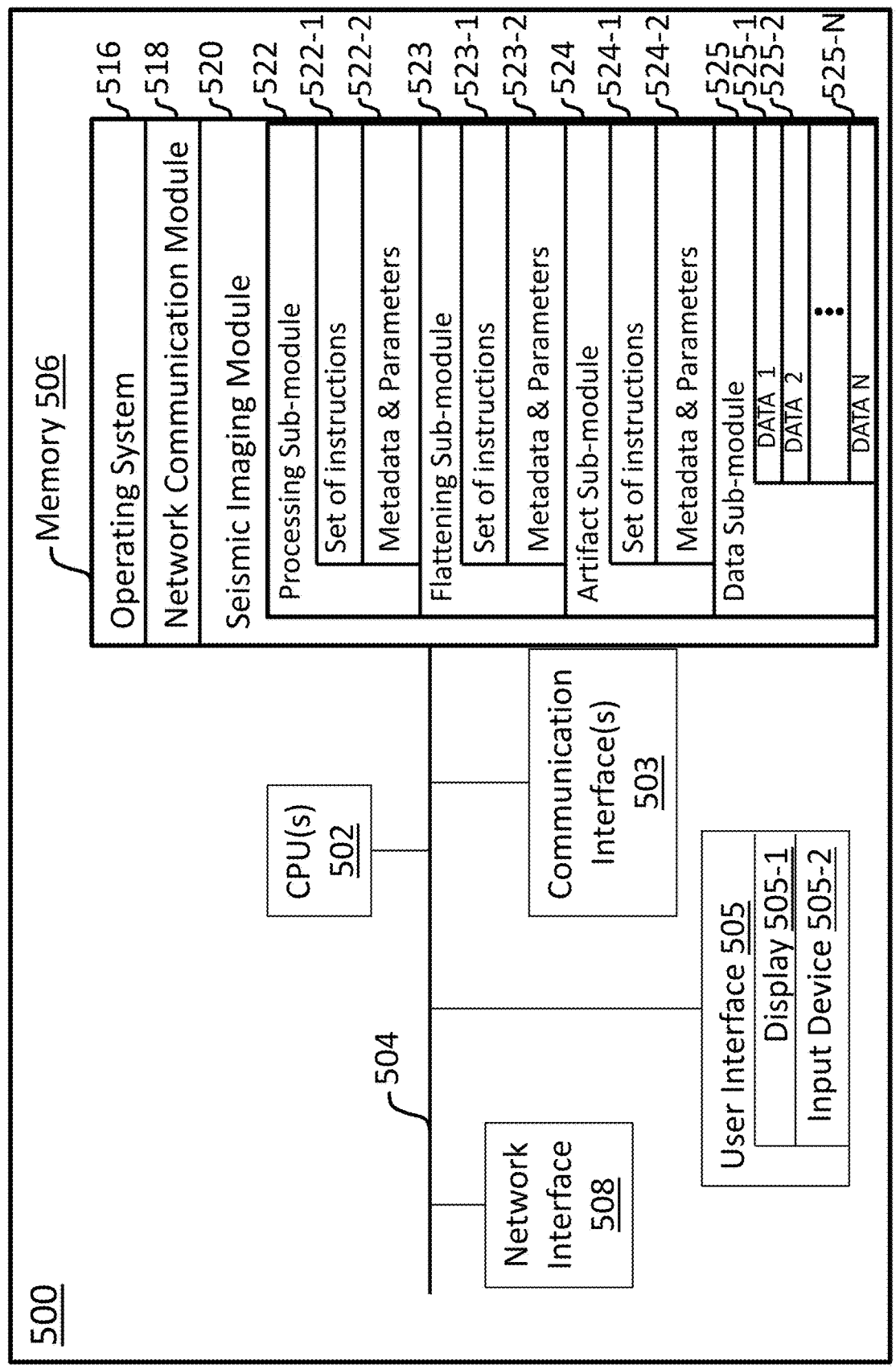
FIG. 4 is a block diagram illustrating a seismic imaging system, in accordance with some embodiments.

FIG. 4 is a block diagram illustrating a seismic imaging system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic imaging system 500 includes one or more processing units (CPUs) 502, one or more network interfaces 508 and/or other communications interfaces 503, memory 506, and one or more communication buses 504 for interconnecting these and various other components. The seismic imaging system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, seismic images, calculated dip corrections, and/or geologic structure information.

In some embodiments, memory 506 or the non-transitory computer readable storage medium of memory 506 stores the following programs, modules and data structures, or a subset thereof including an operating system 516, a network communication module 518, and a seismic imaging module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the seismic imaging module 520 executes the operations of method 100. Seismic imaging module 520 may include data sub-module 525, which handles the seismic dataset including data 525-1 through 525-N which may be, for example, traces, gathers, or slices. This seismic data is supplied by data sub-module 525 to other sub-modules.

Processing sub-module 522 contains a set of instructions 522-1 and accepts metadata and parameters 522-2 that will enable it to execute operation 11 and 16 of method 100. The flattening sub-module 523 contains a set of instructions 523-1 and accepts metadata and parameters 523-2 that will enable it to contribute to operation 12 and 15 of method 100. The artifacts sub-module 524 contains a set of instructions 524-1 and accepts metadata and parameters 524-2 that will enable it to execute at least operation 13 and 14 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 5) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

REFERENCES

U.S. Pat. No. 7,769,546, Method for Indexing a Subsurface Volume For The Purpose of Inferring Geologic Information U.S. patent application Ser. No. 14/595,964, System and Method for Generating a Depositional Sequence Volume from Seismic Data

What is claimed is:

1. A computer-implemented method of seismic imaging, comprising:
   a. receiving, at a computer processor, digital seismic data;
   b. processing the digital seismic data to create processed digital seismic data and performing migration on the processed digital seismic data to generate a digital seismic image in a seismic domain;
   c. flattening the digital seismic image to generate a digital flattened image;
   d. identifying artifacts in the digital flattened image;
   e. transforming only the artifacts back into the seismic domain utilizing tau volume transformation; and
   f. reprocessing the digital seismic data based on the artifacts in the seismic domain to generate a digital image with reduced artifacts.

2. The method of claim 1 further comprising making a decision regarding budgetary planning, obtaining mineral and lease rights, signing well commitments, permitting rig locations, designing well paths and drilling strategy, preventing subsurface integrity issues by planning proper casing and cementation strategies, or selecting and purchasing appropriate completion and production equipment, or any combination thereof, based on the digital image with reduced artifacts.

3. A computer system, comprising:
   one or more processors;
   memory; and
   one or more programs, wherein the one or more programs are stored in the memory and configured to be executed by the one or more processors, the one or more programs including instructions that when executed by the one or more processors cause the device to:
   receive, at the one or more computer processors, digital seismic data;
   process the digital seismic data to create processed digital seismic data and perform migration on the processed digital seismic data to generate a digital seismic image in a seismic domain;
   flatten the digital seismic image to generate a digital flattened image;
   identify artifacts in the digital flattened image;
   transform only the artifacts back into the seismic domain utilizing tau volume transformation; and
   reprocess the digital seismic data based on the artifacts in the seismic domain to generate a digital image with reduced artifacts.

4. A non-transitory computer readable storage medium storing one or more programs, the one or more programs comprising instructions, which when executed by an electronic device with one or more processors and memory, cause the device to:
   receive, at one or more computer processors, digital seismic data;
   process the digital seismic data to create processed digital seismic data and perform migration on the processed digital seismic data to generate a digital seismic image in a seismic domain;
   flatten the digital seismic image to generate a digital flattened image;
   identify artifacts in the digital flattened image;
   transform only the artifacts back into the seismic domain utilizing tau volume transformation; and
   reprocess the digital seismic data based on the artifacts in the seismic domain to generate a digital image with reduced artifacts.

* * * * *